(12) United States Patent
Sestito et al.

(10) Patent No.: US 7,712,428 B2
(45) Date of Patent: May 11, 2010

(54) MODULAR FLOATING CONSTRUCTION

(75) Inventors: Ilario Sestito, Piacenza (IT); Rosolino Tarenzi, Piacenza (IT)

(73) Assignee: ISEA S.p.A., Piacenza (IT)

( * ) Notice: Subject to any disclaimer, the term of this patent is extended or adjusted under 35 U.S.C. 154(b) by 6 days.

(21) Appl. No.: 11/788,896

(22) Filed: Apr. 23, 2007

(65) Prior Publication Data

US 2007/0245942 A1   Oct. 25, 2007

(30) Foreign Application Priority Data

Apr. 24, 2006   (IT) .......................... MI2006A0823

(51) Int. Cl.
*B63B 35/44* (2006.01)
(52) U.S. Cl. .................. 114/267; 114/264; 114/266
(58) Field of Classification Search .............. 114/264, 114/266, 267; 441/35, 47, 50, 133; 405/171
See application file for complete search history.

(56) References Cited

U.S. PATENT DOCUMENTS

| | | | | | |
|---|---|---|---|---|---|
| 4,631,039 | A | * | 12/1986 | Meriwether | 441/133 |
| 4,928,617 | A | * | 5/1990 | Meriwether | 114/267 |
| 5,588,387 | A | * | 12/1996 | Tellington | 114/261 |
| 6,860,219 | B1 | * | 3/2005 | Dempster | 114/264 |
| 7,112,008 | B2 | * | 9/2006 | Sestito et al. | 405/171 |
| 2003/0121463 | A1 | * | 7/2003 | Rice | 114/61.1 |

* cited by examiner

*Primary Examiner*—S. Joseph Morano
*Assistant Examiner*—Daniel V Venne
(74) *Attorney, Agent, or Firm*—Hedman & Costigan, P.C.; James V. Costigan

(57) ABSTRACT

A modular floating construction comprises one or more floating bodies having platforms including removable latching means, thereby providing floating stages, wharfs, working platforms to be used on water surfaces in general.

6 Claims, 17 Drawing Sheets

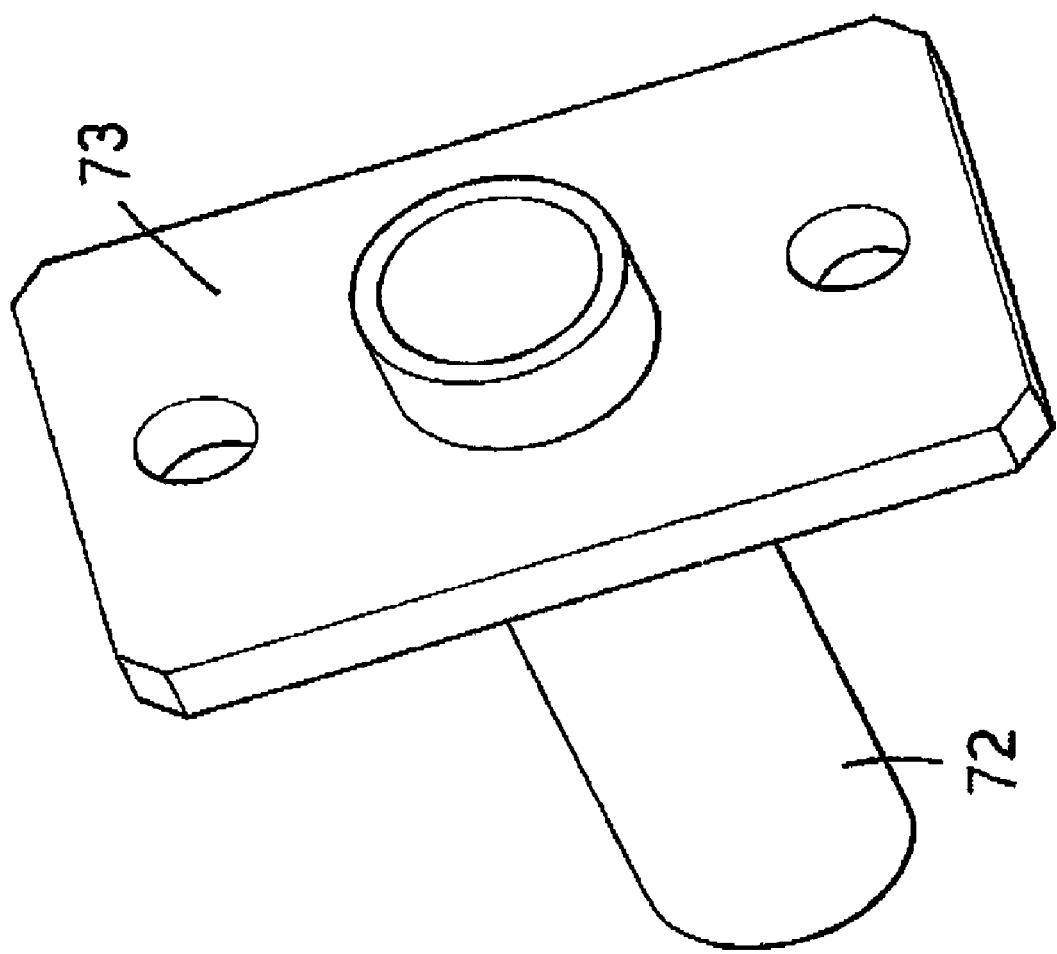

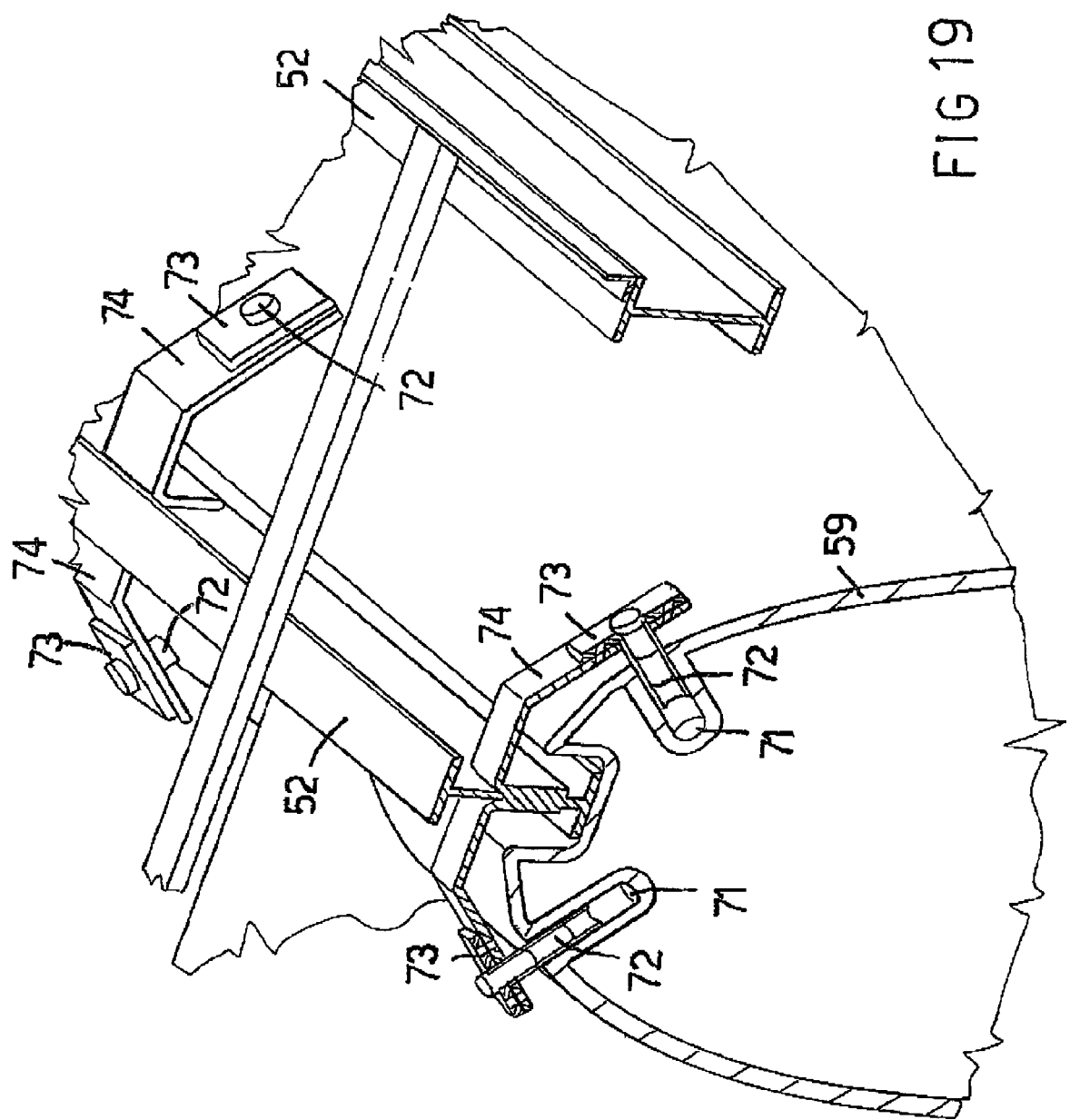

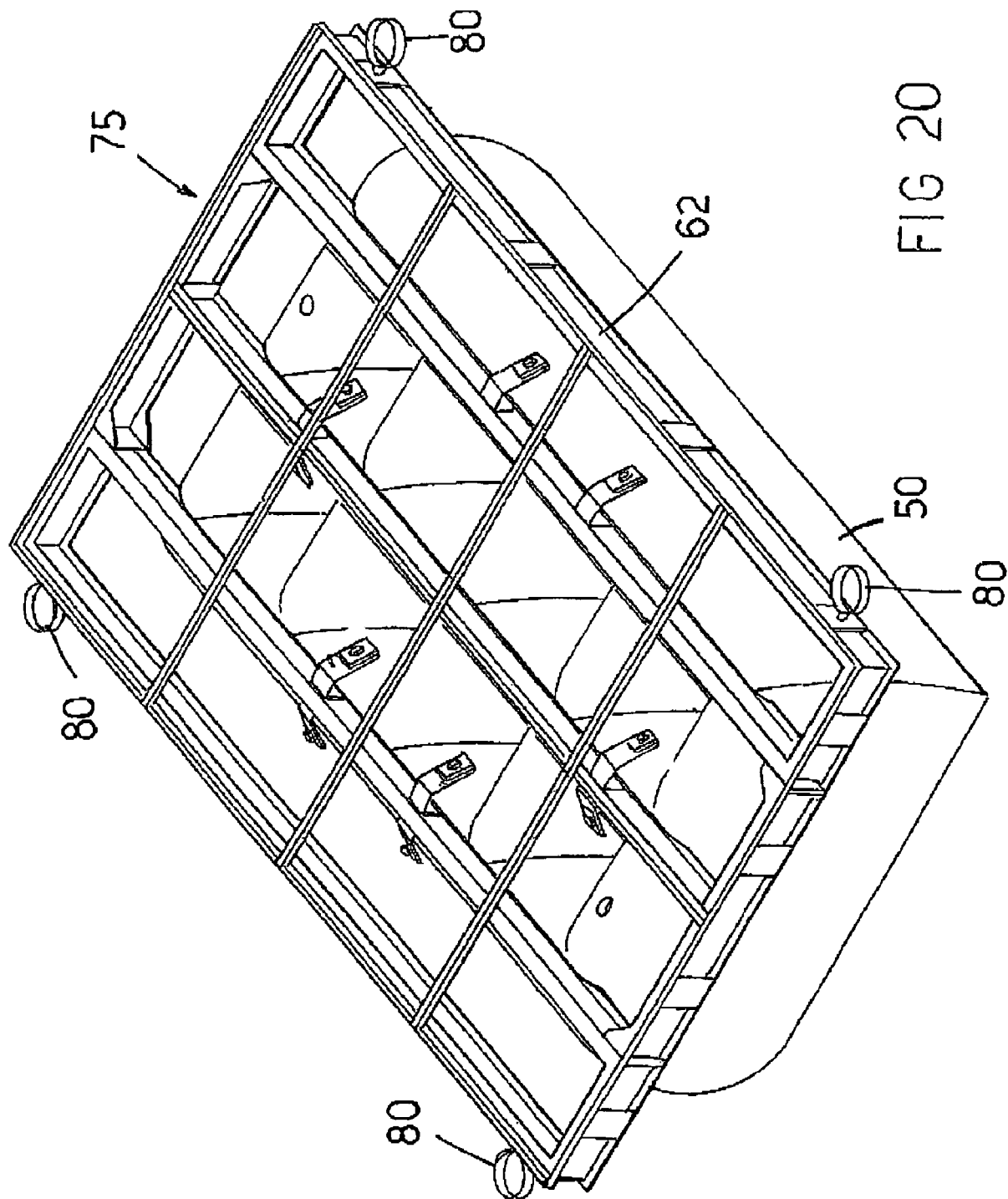

MODULAR FLOATING CONSTRUCTION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A MICROFICHE APPENDIX

Not Applicable

BACKGROUND OF THE INVENTION

Field of the Invention

The present invention relates to a modular floating construction, comprising a plurality of floating bodies including platforms having removable latching or locking means.

Said removable locking means are coupled to one another by metal constructions, thereby providing floating boats, wharfs, working stages to be used on sea, rivers and water surfaces in general.

The floating constructions according to the invention, as suitably coupled to one another, may also be used for supporting barring dams, for controlling diffusions through water of polluting liquids.

Those same floating constructions may moreover be used for testing cables and pipes, and have the main characteristic that they can adjust, depending on contingent requirements, their bouyancy properties.

If the floating construction according to the invention is used for installing pipes and cables on deep waters, then it is necessary to provide a plurality of floating bodies, having corrosion resistant properties, and including supporting and releasing means for supporting and releasing the above mentioned cables and pipes, and further having high stability properties, even in a rough see condition.

The subject floating constructions can be coupled to one another, thereby providing wharfs for unloading goods from vessels and for supporting cables and pipes for connecting vessels and other boats to the ground, if harbours and mooring means are lacking in shallow waters.

SUMMARY OF THE INVENTION

Thus, the aim of the present invention is to provide such a modular floating construction which allows to adjust its buoyancy properties, thereby fitting the contingent requirements.

Within the scope of the above mentioned aim, a main object of the invention is to provide such a modular floating construction which can be quickly and easily assembled and disassembled, thereby providing composite floating constructions of the above mentioned type.

In particular, the engagement of the subject floating constructions is facilitated also in relationship to cables and pipes to be supported and optionally to be lowered into the water, thereby simplifying all the related operating steps.

Moreover, the subject floating construction, owing to its specifically designed structural features, is very reliable and safe in operation.

Yet another object of the present invention is to provide such a floating construction for supporting and testing or launching cables and pipes which can be easily made and which, moreover, is very competitive from a mere economic standpoint.

According to one aspect of the present invention, the above mentioned aim and objects, as well as yet other objects, which will become more apparent hereinafter, are achieved by a floating construction, characterized in that said floating construction comprises at least a hollow floating body, made of a plastics material, and connectable to a metal construction, for connecting a plurality of plastics material floating elements, thereby providing modular floating constructions adapted to operate as decks, loading wharfs, working platforms, and also adapted to support cables and pipes.

BRIEF DESCRIPTION OF THE DRAWINGS

Further characteristics and advantages of the present invention will become more apparent hereinafter from the following detailed disclosure of some preferred, though not exclusive, embodiment of a modular floating construction according to the invention, which is illustrated, by way of an indicative, but not limitative example, in the accompanying drawings, where:

FIG. 18 schematically shows the above mentioned pivot pins to be engaged in cavities formed in the plastics material floating body, a detail of which is shown in FIG. 17;

FIG. 19 is an upper side perspective view showing a detail of coupling elements for connecting the plastics material floating body to the top or upper constructional elements forming a fitting element for fitting and coupling structural elements, to be associated with one another thereby simultaneously providing an upper platform; and FIG. 20 shows a floating construction including auxiliary ring elements for anchoring said floating construction.

DESCRIPTION OF THE PREFERRED EMBODIMENTS

Figure 1:
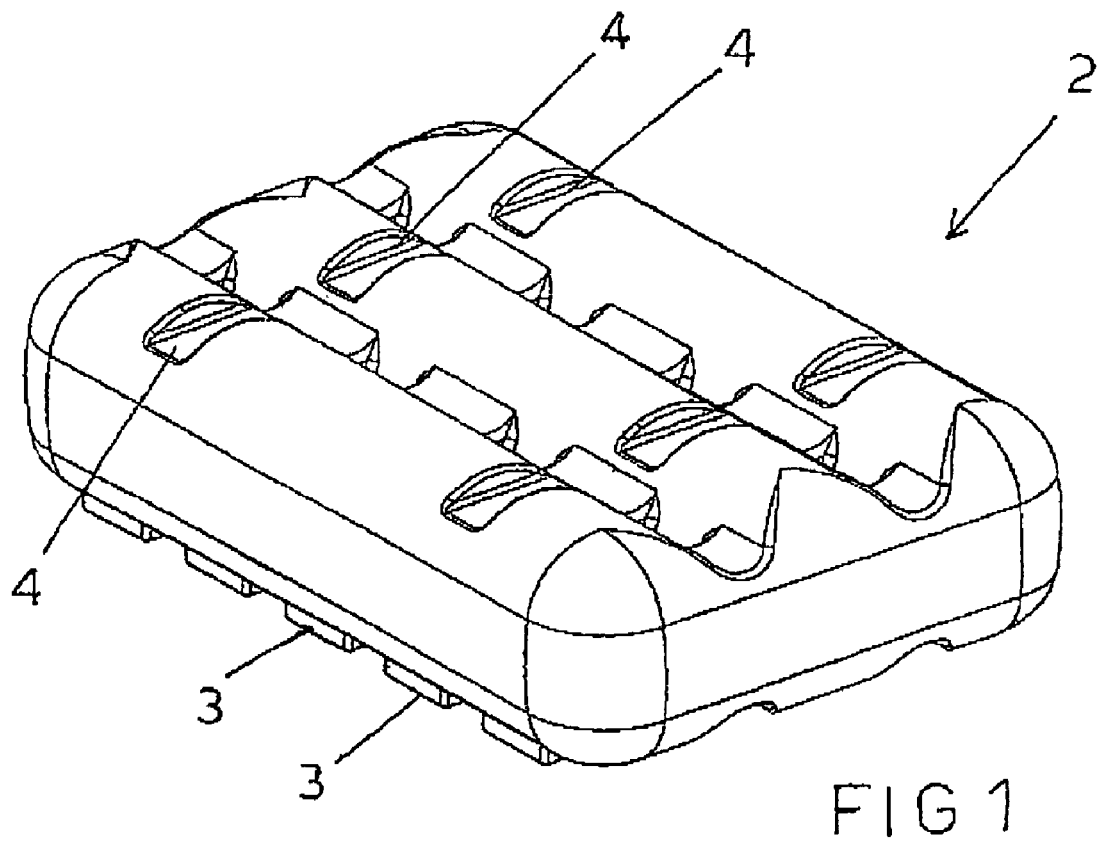
FIG. 1 is a schematic perspective view schematically showing the floating body of the modular floating construction according to the present invention.
Figure 2:
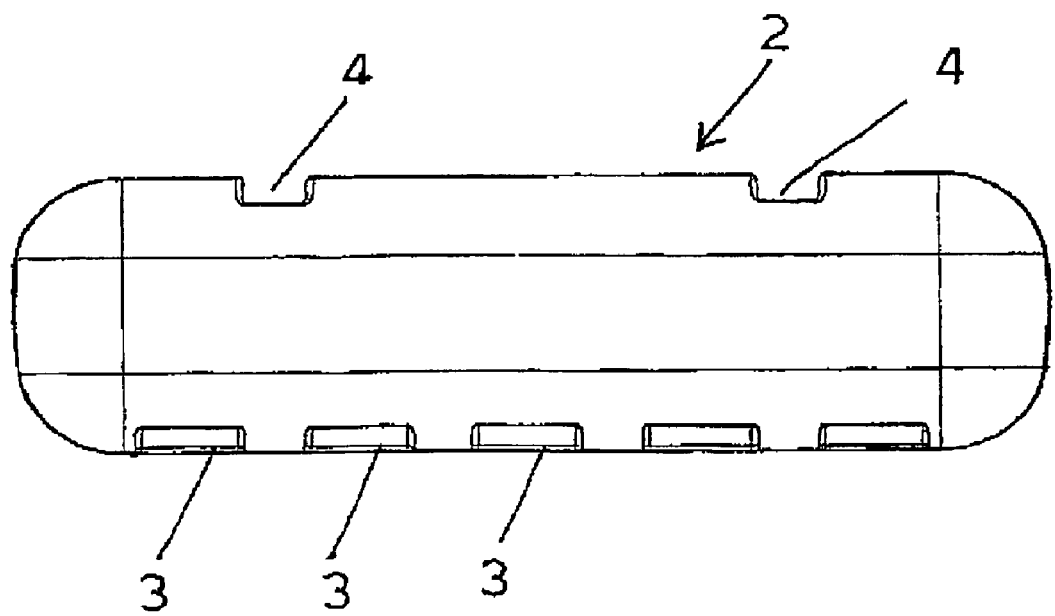
FIG. 2 is an elevation view showing that same floating body.
Figure 3:
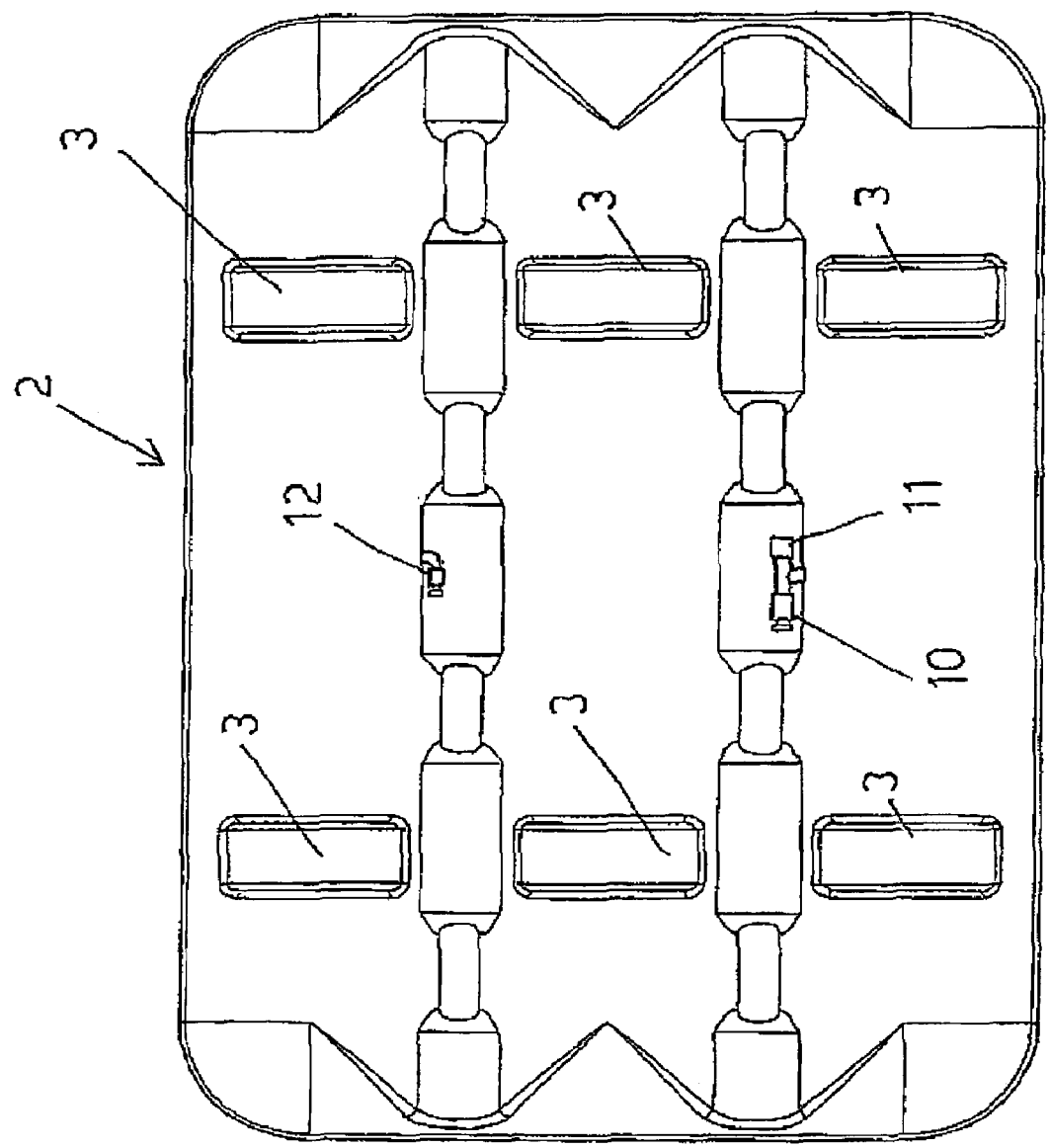
FIG. 3 is a top plan view of the floating body.
Figure 4:
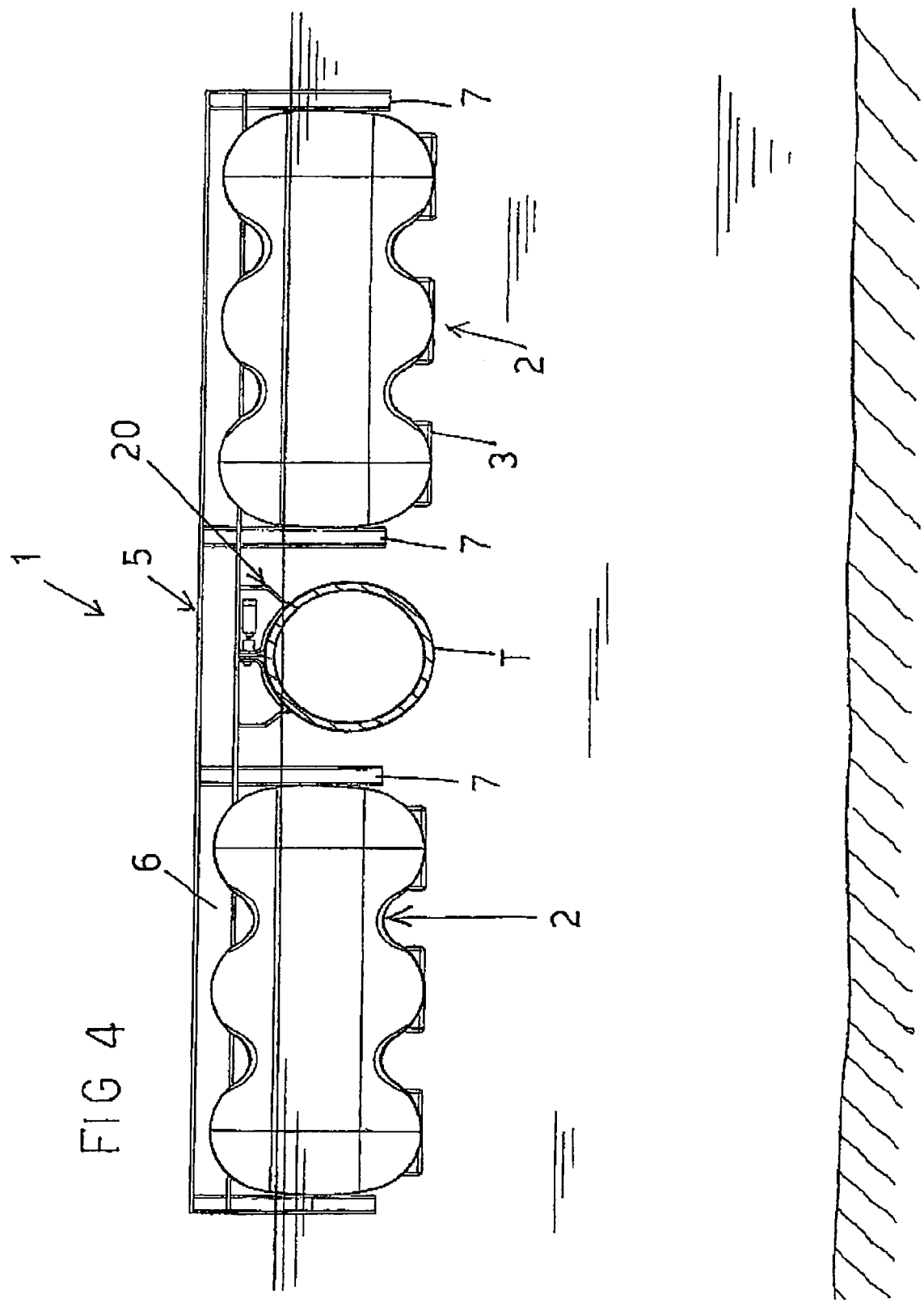
FIG. 4 shows a floating construction, supporting a pipe.
Figure 5:
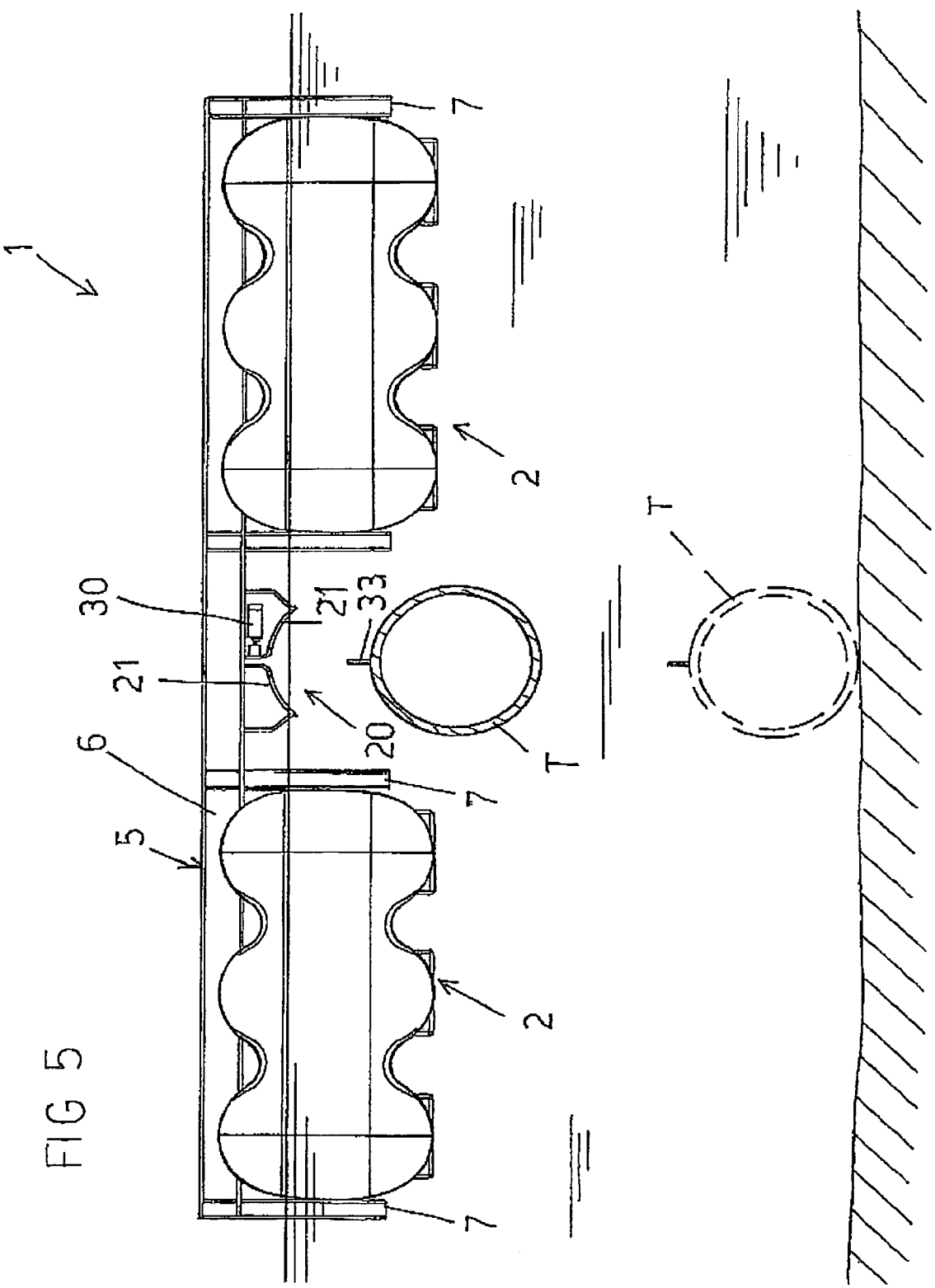
FIG. 5 shows the subject floating construction, as it is disengaged from the pipe.
Figure 6:
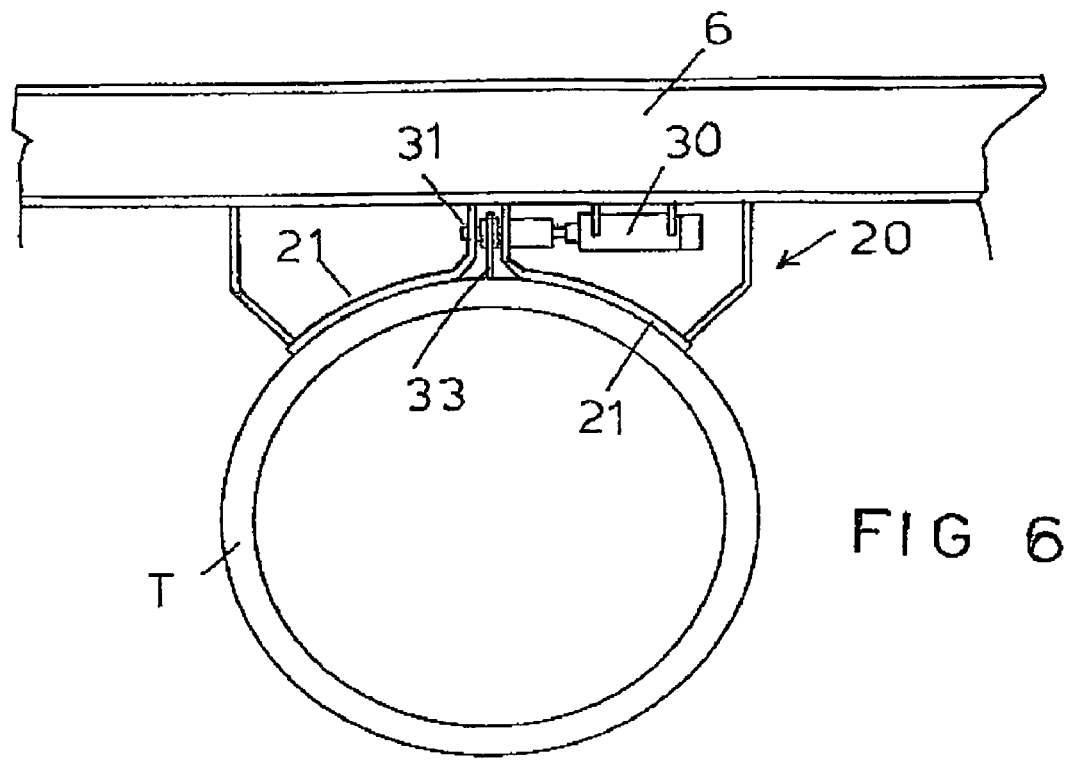
FIG. 6 shows, on an enlarged scale, the coupling means for removably coupling a pipe, and related locking or latching removable means.
Figure 7:
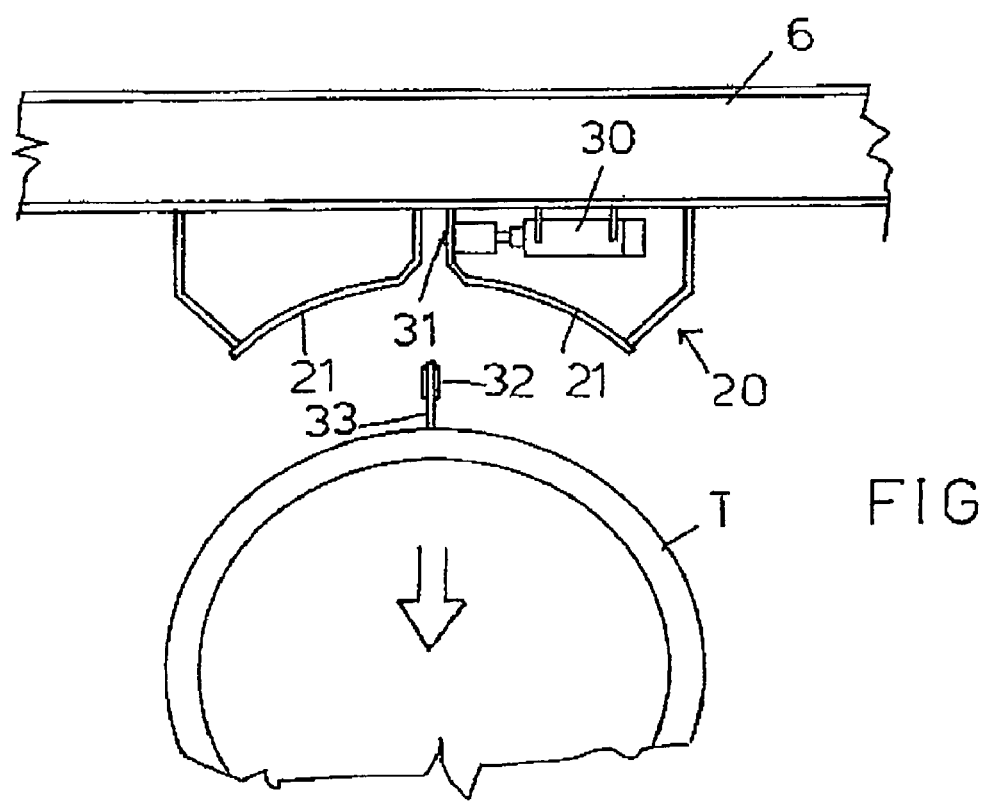
FIG. 7 shows, on an enlarged scale, the pipe disengaging operation.
Figure 8:
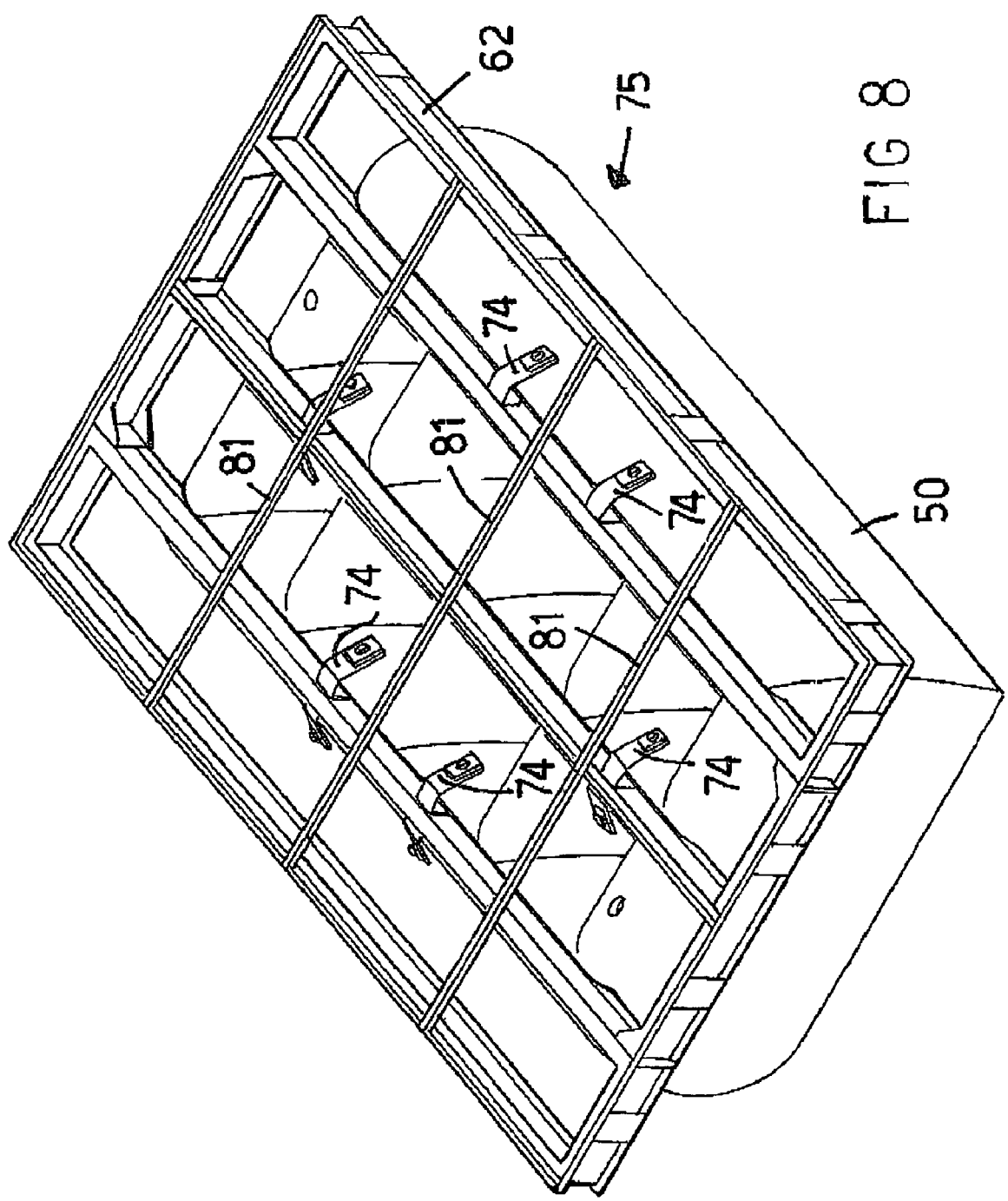
FIG. 8 shows a side perspective view of the top portion of a structural element of the modular floating construction according to the invention.

With reference to the number references of FIGS. 1-7, the modular floating construction according to the invention, in an embodiment thereof designed for testing or launching pipes, which has been generally indicated by the reference number 1, comprises a plurality of floating bodies 2 which have advantageously a substantially flat configuration and are made of a polyethylene material, by spin-molding operations.

The thickness of the used materials is so designed as to resist against the hydrostatic force.

The hollow floating body 2 is provided, at the bottom thereof, with resting or bearing projections 3 and, at the top thereof, with recesses 4 for engaging with a supporting framework 5 which will be disclosed in a more detailed manner hereinafter.

More specifically, the floating body 2, as stated, is hollow and comprises a lead-in element 10 for introducing water thereinto, said lead-in element 10 having a check valve and a quick attachment or fitting.

Moreover, a counter-pressure valve 11 which is adjusted to a preset pressure level is moreover provided.

On the top surface of the floating body an air inlet 12 is arranged, which also comprises a quick type of coupling.

The framework 5 is advantageously provided with top cross members 6, which are housed in their respective recesses 4 and comprise a plurality of vertical restraining elements 7 laterally engaging with the floating bodies 2, thereby allowing to practically sling said floating bodies, to easily support them.

Said framework 5 comprises moreover coupling means for removably coupling a pipe, said coupling means being indicated generally by the reference number 20, and comprising a plurality of recessed portions 21, made of a metal sheet material, connected to a cross member 6 thereby defining a coupling seat for a pipe generally indicated by the reference letter T.

Removable latching means for removably coupling said pipe are moreover provided, said removable latching or locking means being adapted to be operated from outside and being advantageously arranged at said removable coupling means 20.

The removable locking or latching means, in particular, comprise a hydraulic cylinder 30, driving a locking pin 31, engaging in a respective seat 32 defined on a gusset element 33, directly welded on the pipe.

An outer central unit drives said hydraulic cylinder 30 which, by driving in turn said pin, allows to perform an unlocking operation, with the consequent launching of the pipe or cable to be lowered into the sea.

In this connection it should be apparent that it is further possible to provide other removable latching or locking means, without directly welding the gusset 33 on the pipe, and by using, for example, very simple systems, such as calandered metal sheet material ties, coupled by bolt elements.

Thus, the provision of the above mentioned water lead-in element 10, allows to modulate or finely adjust its buoyancy, by introducing a desired amount of water.

The subject system, accordingly, provides the possibility of properly adjusting said buoyancy, by loading, through a pump system, the chamber defined inside the floating body.

Water is introduced through a water loading manifold, also including the above mentioned counter-pressure or check valve.

To empty the chamber, air is pumped from the air inlet duct 12 thereby providing a pressure in the inside of said floating body, allowing the check valve 11 to be opened, while allowing water to exit.

The air inlet 12 also operates as a bleeding element.

In other words, that same valve allows air to exit the chamber, as the vessel is filled-in by water.

In this connection it should be apparent that, if desired, it is possible to use the above disclosed inlets, to supply a polyurethane foam, thereby providing a stable floating characteristic.

It is moreover desired to point out that a main feature of the present invention is the provision of a plastics material body 2 including bulged ridges providing, the thickness being the same, said plastics material floating element, with a very high mechanical strength against impacts and a larger resistance against air or other gas pressures supplied into the duct arrangements coupled to each plastics material floating element.

With reference to FIGS. 8-18, it should be apparent that the subject modular floating construction 75 comprises a floating body 50, made of a plastics material, including a plurality of longitudinal recesses 54 for housing therein corresponding longitudinal bars 52 having anchoring brackets for coupling to the floating body 50 a plurality of longitudinal section members 51, cooperating to form the metal material top platform 62.

Said floating construction 75 comprises moreover a plurality of longitudinal elements 51 cooperating to form, jointly with said longitudinal bars 52 including corresponding anchoring brackets 74, the top metal platform 62 applied to the plastics material floating body 50.

Figure 9:
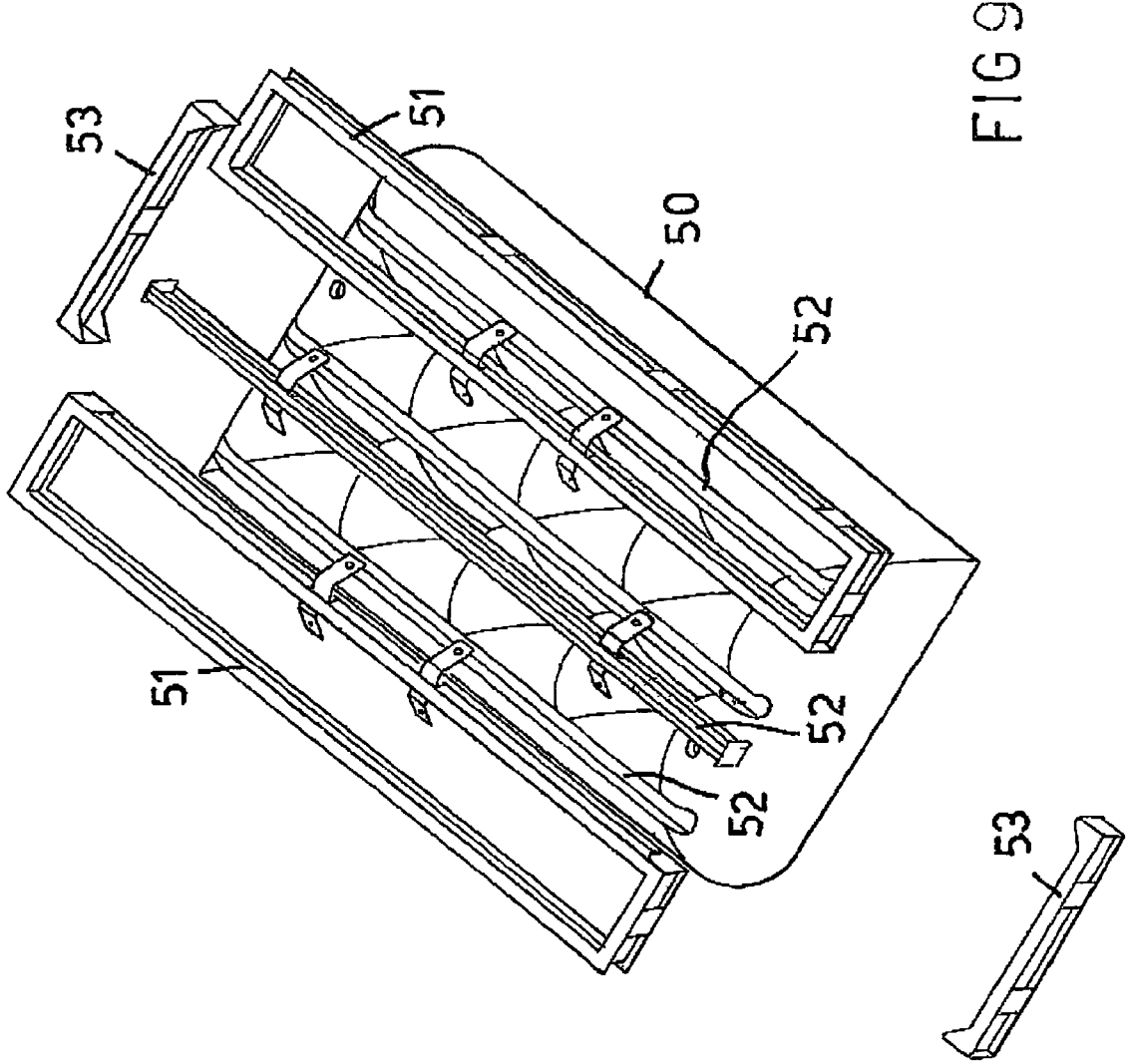
FIG. 9 shows an exploded view of the constructional elements comprising a plastics material floating member and related metal members which can be coupled to the metal modular constructions associated with other adjoining floating components.
Figure 10:
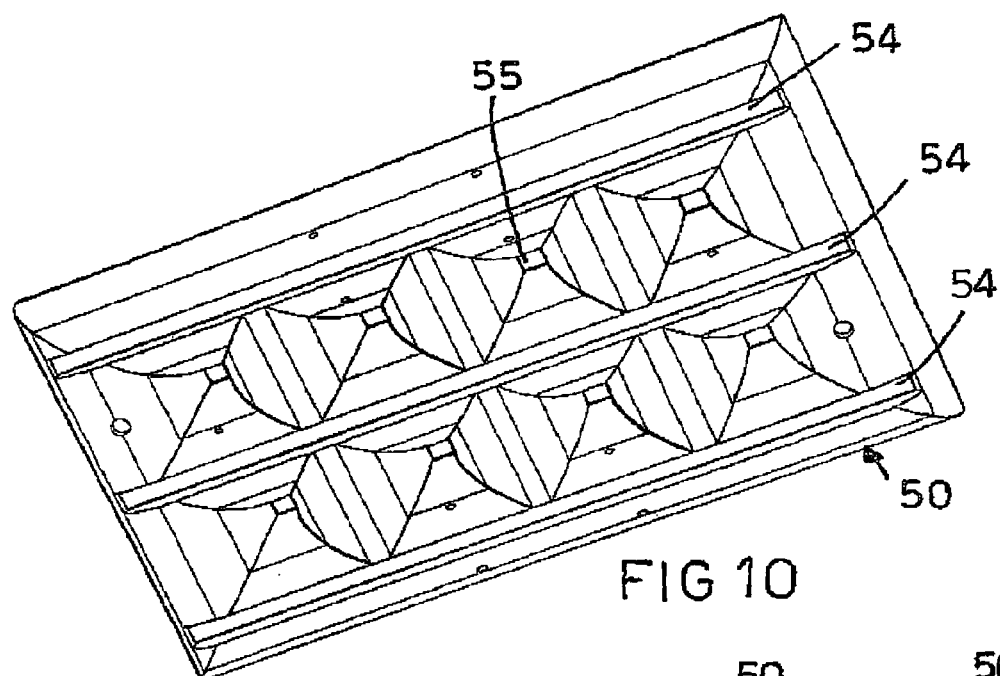
FIGS. 10 and 11 show two different views, respectively a perspective view and a top plan view, of a floating body constituting an integrating part of the modular floating construction according to the invention.
Figure 11:
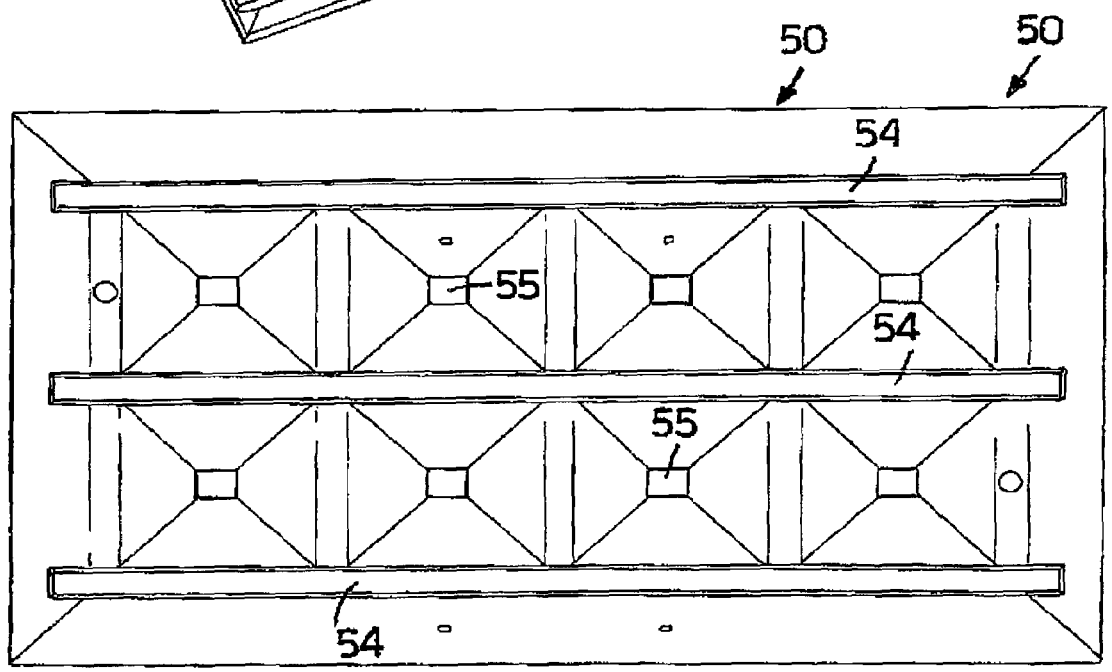
Figure 12:
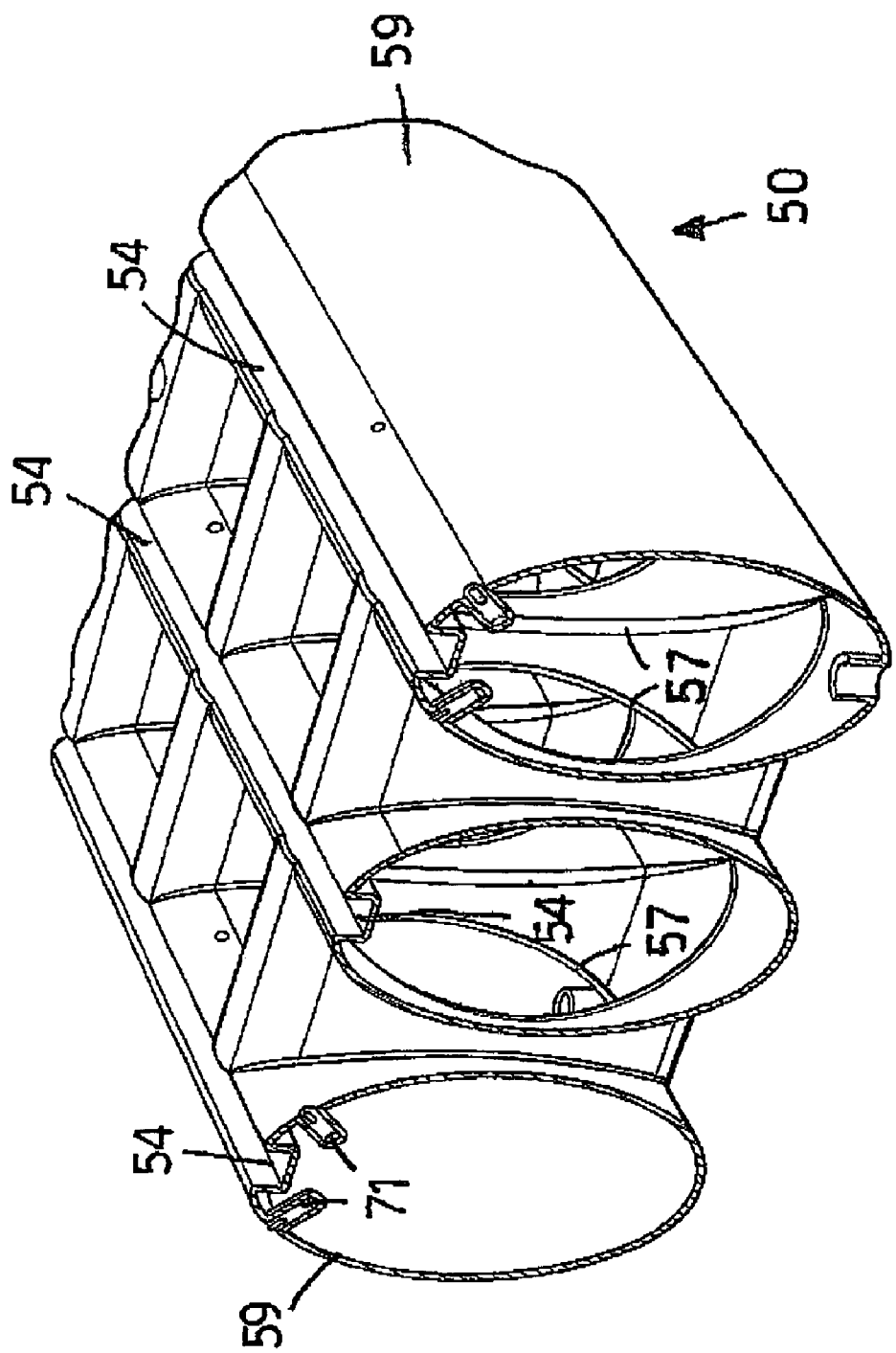
FIG. 12 is a cross-sectioned side perspective view, showing the plastics material floating body construction, constituting an integrating part of the present invention.
Figure 13:
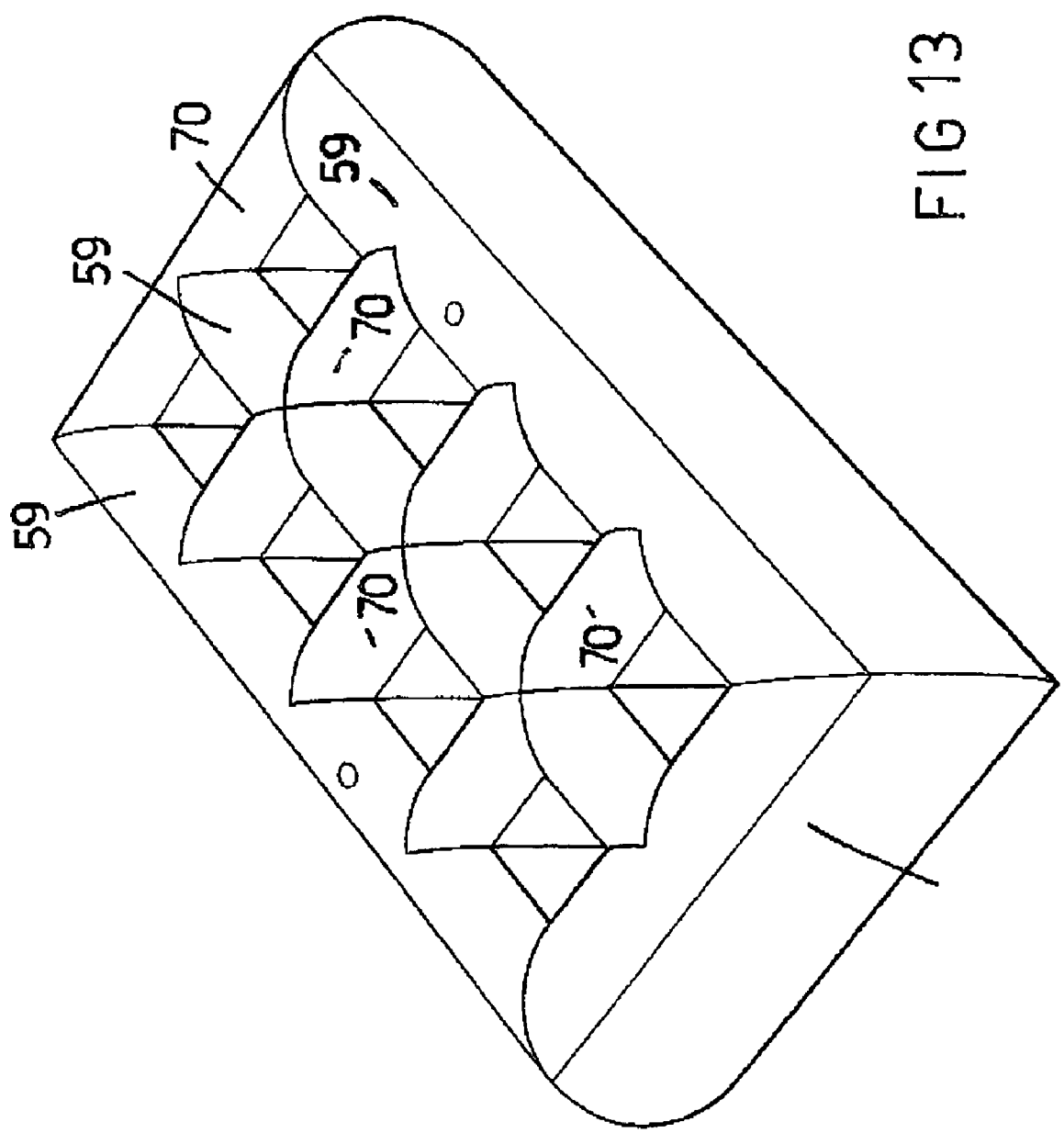
FIG. 13 is a perspective view of that same plastics material modular element shown in FIGS. 10 and 11.
Figure 14:
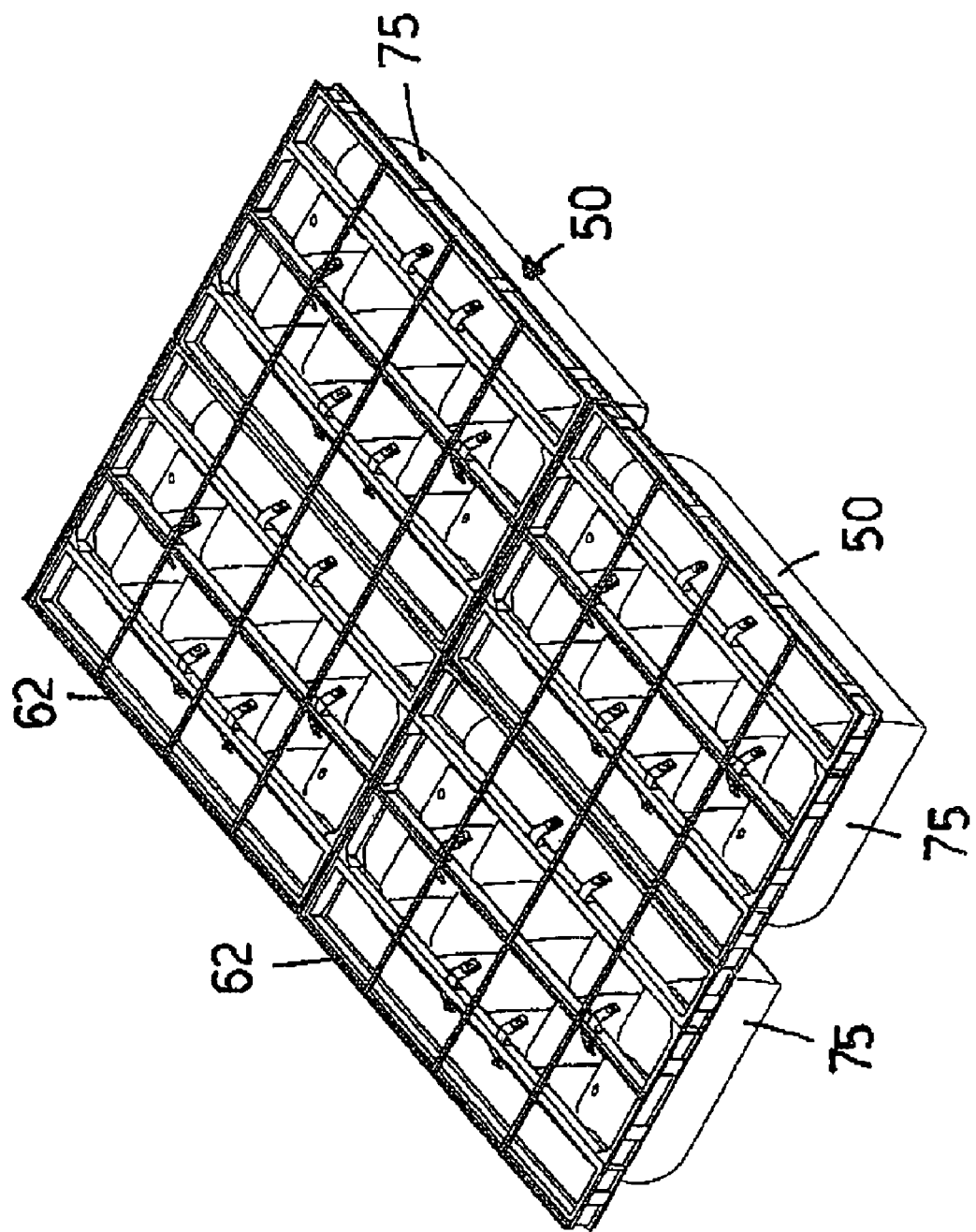
FIG. 14 shows a further side perspective view of four floating plastics material elements associated with connecting metal constructions, which are mutually coupled to one another.
Figure 15:
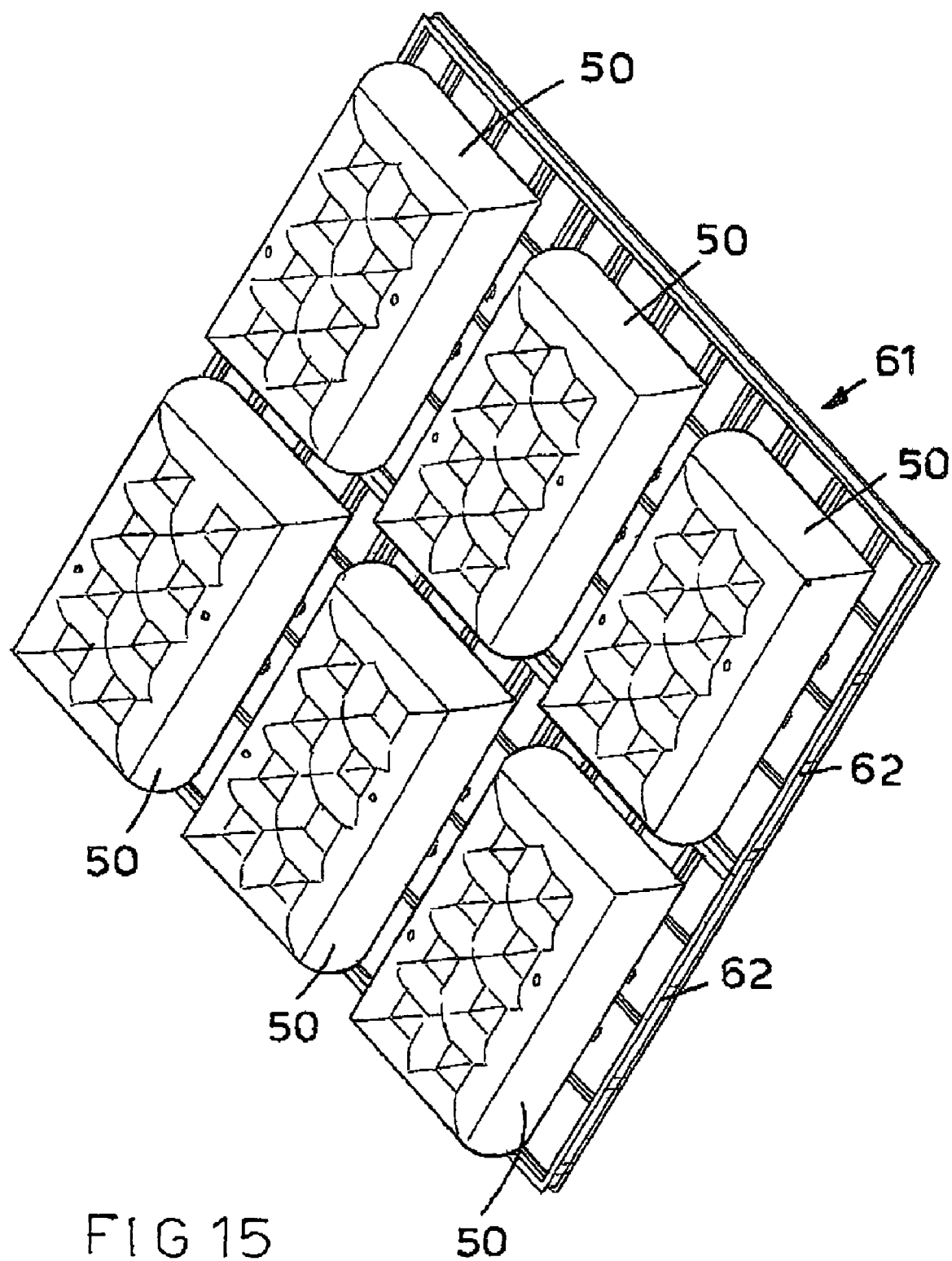
FIG. 15 shows a further perspective view of six plastics material floating elements, having coupling constructions and seen from the bottom.
Figure 16:
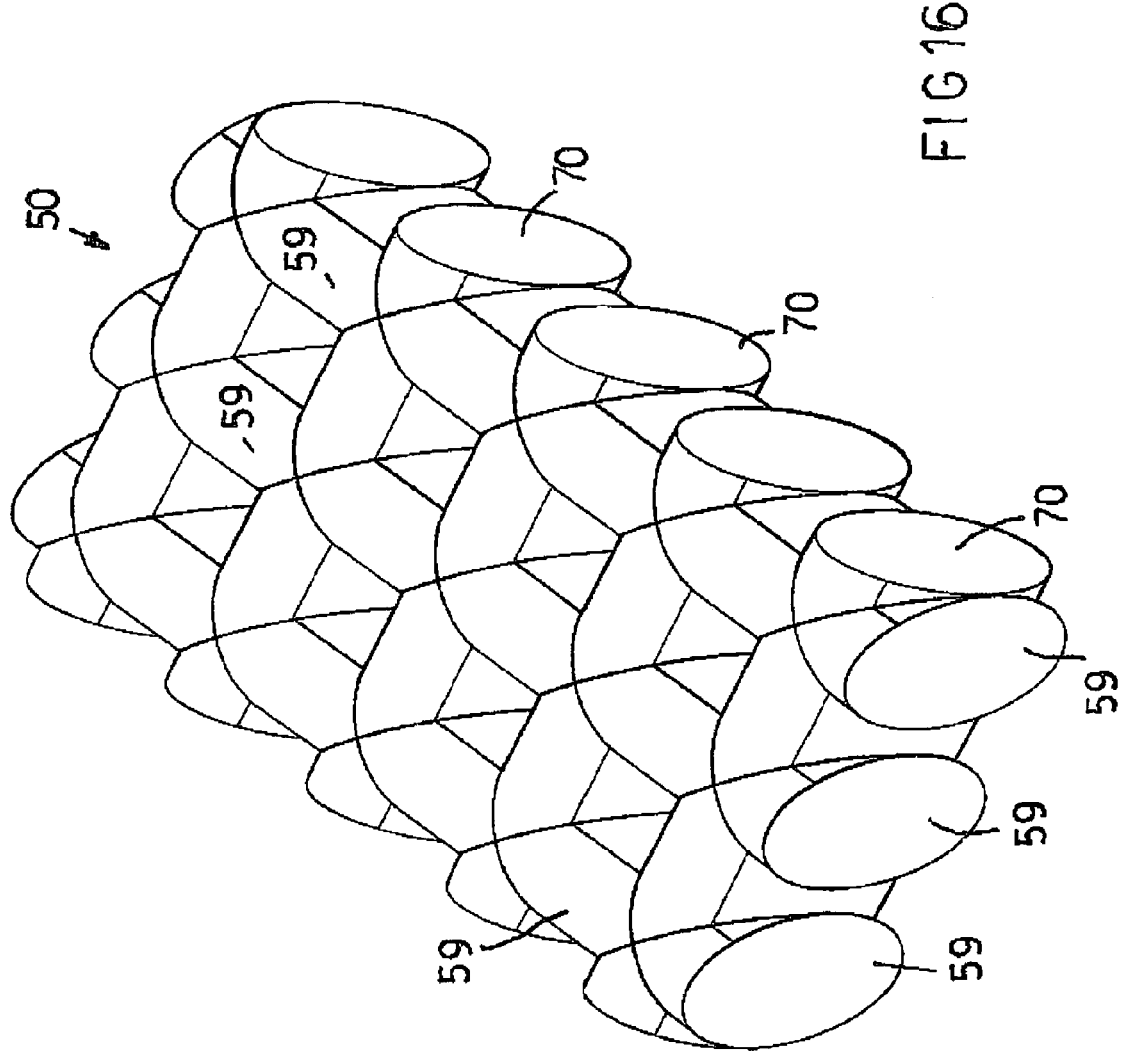
FIG. 16 shows a further upper side perspective view of a plastics material floating element, and clearly shows the elliptical structure of the crossed tubular compartments, forming said plastics material floating body.
Figure 17:
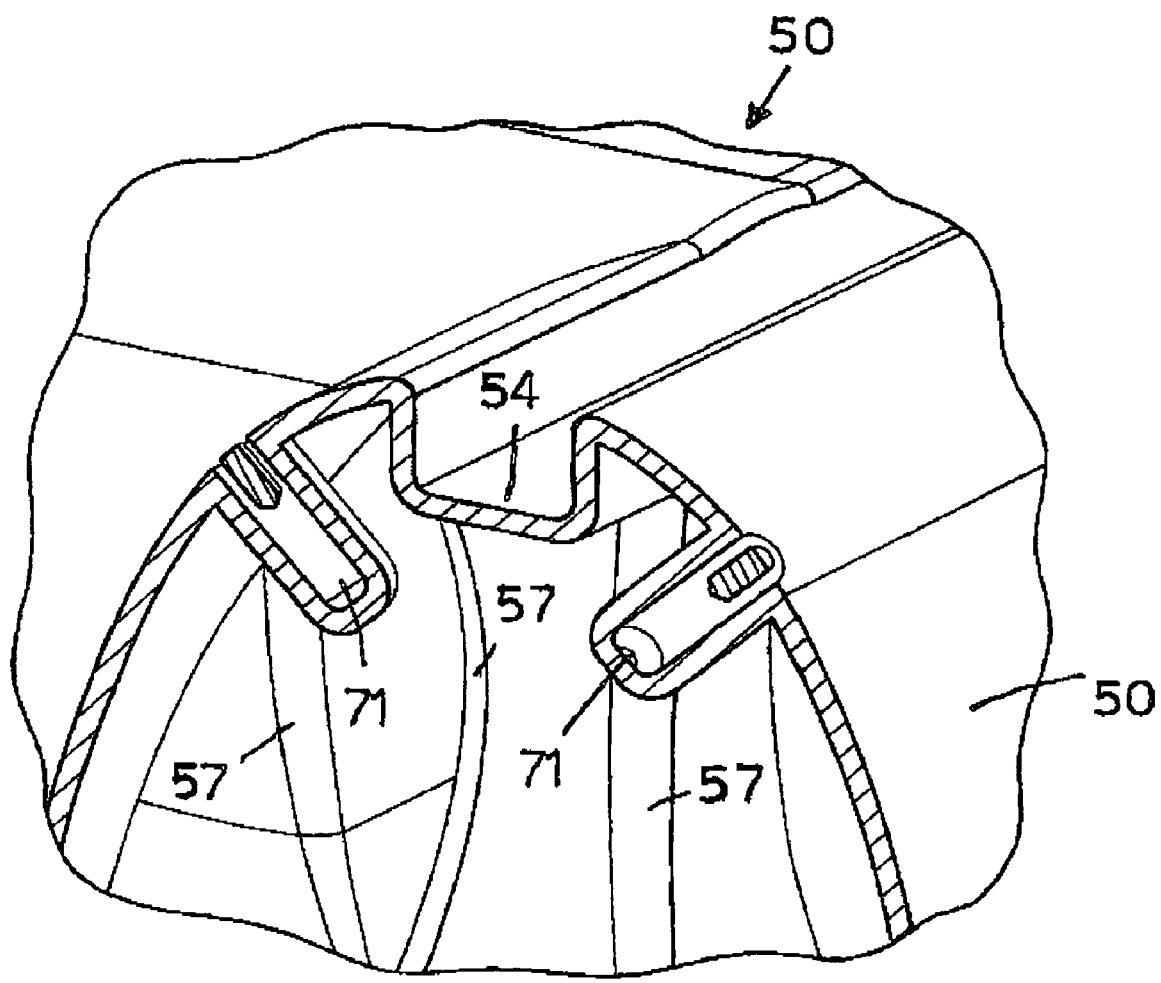
FIG. 17 shows an enlarged-scale partial perspective view, illustrating a section of an approximately elliptical compartment forming an integrating part of the plastics material floating element; and more specifically in FIG. 17 are clearly shown housing recesses for pivot pins allowing to connect a plastics material element to the fitting upper metal construction for coupling a plurality of modular floating constructions according to the invention.

Said top platform 62 comprises moreover a plurality of cross bars 53, clearly shown in FIG. 9.

The plastics material floating body 50 comprises a plurality of throughgoing holes 55.

The top metal platform 62 of the modular floating construction according to the invention comprises a plurality of longitudinal bars 51, having corresponding brackets 74 matching with plate-like elements 73 rigid with the pins 72, said pins 72 being received in corresponding cavities 71 formed in the plastics material floating bodies 50.

More specifically, the longitudinal bars 51 are coupled to cross section members 81 cooperating to form the top platform 62 of the subject modular floating construction.

As shown, the plastics material floating body 50 has a complex construction including longitudinal floating compartments 59 and cross floating compartments 48, of elliptical cross-sections, providing a complex construction having a great mechanical strength against the air pressure, the air being supplied inside the floating body 50 thereby suitably changing its buoyancy properties.

As a further feature, the modular floating construction 75 according to the invention can also comprise suitable side latching or locking elements 80, comprising, for example, ring members, for anchoring the individual modular floating constructions 75.

As shown, the plastics material floating body 50 shown in FIGS. 9 to 20 comprises, in its inside, a plurality of structural elements or ribs 57, providing said floating body 50 with a great mechanical strength.

If desired, it is possible to use the above mentioned inlets to supply a polyurethane foam, thereby providing floating properties which will be stable in the time.

From the above disclosure it should be apparent that the invention fully achieves the intended aim and objects.

In particular, the invention provides a hollow floating body including a plurality of water and air inlets and outlets, which allows to change in a very broad range, its buoyancy properties.

The invention, as disclosed, is susceptible to several modifications and variations, all coming within the scope of the invention.

Moreover, all the constructional details can be replaced by other technically equivalent elements.

In practicing the invention, the used materials, as well as the contingent size and shapes can be any, depending on requirements.

The invention claimed is:

1. A modular adjustable buoyancy floating construction to be used on water surfaces in general, for launching and testing cables and pipes and for supporting barring dams, for preventing polluting liquids from diffusing into water, said modular floating construction comprising a plurality of removably intercoupled floating bodies, each said floating body being a plastic material hollow floating body adapted to be filled by water and/or a gas, and having bottom bearing projections and top recesses for engaging therein a supporting framework, said supporting framework comprising, a plurality of top cross members engaged in said top recesses and including vertical restraining elements laterally engaging with and adjoining said floating bodies, said framework further comprising removable coupling means for removably coupling pipes or cables, said removable coupling means including a plurality of recessed portions made of a metal sheet material coupled to a cross member thereby defining a coupling seat for a respective pipe, said modular floating construction further comprising removable locking means for locking a respective pipe, said removable locking means being adapted to be operated from outside and being arranged in said removable coupling means, said removable locking means comprising a hydraulic cylinder driving a looking pin element engaging in a seat defined on a gusset element directly welded on said respective pipe, said modular floating construction also comprising an outer central unit actuating said hydraulic cylinder to drive said pin to launch said pipe onto said water surface, wherein each said floating body comprises a plurality of longitudinal compartments and cross compartments of elliptical cross-sections and cooperating stiffening and reinforcement inner elements, wherein said floating body further comprises a plurality of longitudinal recesses for housing therein corresponding longitudinal bars, including coupling brackets cooperating to form a top metal platform of said modular floating construction, and wherein said modular floating construction further comprises a plurality of longitudinal section elements cooperating with said longitudinal bars to form said top metal platform of said modular floating construction.

2. A modular floating construction, according to claim 1, wherein said top metal platform comprises a plurality of cross bars.

3. A modular floating construction, according to claim 1, wherein said top metal platform comprises a plurality of longitudinal bars including corresponding brackets rigidly coupled with plate elements rigid with corresponding pins.

4. A modular floating construction, according to claim 3, wherein said plate elements are formed in longitudinal section members of said floating body.

5. A modular floating construction, according to claim 4, wherein said longitudinal bars are coupled by cross members.

6. A modular floating construction, according to claim 1, wherein said top metal platform includes a plurality of side connecting means including anchoring ring elements.

\* \* \* \* \*